US006658365B2

United States Patent
Kodaira

(10) Patent No.: US 6,658,365 B2
(45) Date of Patent: Dec. 2, 2003

(54) COLLISION AVOIDANCE SYSTEM, POSITION DETECTOR, COLLISION AVOIDANCE METHOD, POSITION DETECTING METHOD AND PROGRAM FOR REALIZING THE SAME

(75) Inventor: Minoru Kodaira, Yamagata (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 09/985,656

(22) Filed: Nov. 5, 2001

(65) Prior Publication Data

US 2002/0055823 A1 May 9, 2002

(30) Foreign Application Priority Data

Nov. 6, 2000 (JP) ........................................ 2000-337438

(51) Int. Cl.[7] .......................... G01P 11/00; G06F 15/00
(52) U.S. Cl. ....................... 702/142; 702/149; 702/150
(58) Field of Search ........................ 702/94, 95, 142, 702/149, 150; 700/214, 215, 218, 228, 255, 112–114, 302, 304; 701/93, 96, 110, 116

(56) References Cited

U.S. PATENT DOCUMENTS 6,161,058 A * 12/2000 Nishijo et al. .............. 700/218
6,230,075 B1 * 5/2001 Nishijo et al. .............. 700/214

FOREIGN PATENT DOCUMENTS

JP          3-100809         4/1991

* cited by examiner

*Primary Examiner*—Bryan Bui
(74) *Attorney, Agent, or Firm*—McGinn & Gibb, PLLC

(57) ABSTRACT

A travelling track on which a plurality of movers travel is divided into sections of various lengths. A position/velocity calculator obtains the position and velocity of the movers in the sections, using the position and velocity of each mover having passed the boundary of the section in which the mover travels. A collision-chance determiner determines whether there is a great chance that each pair of neighboring movers will collide with each other, using the position and velocity obtained by the position/velocity calculator. An emergency stopper stops a pair of neighboring movers that the collision-chance determiner determined that they would collide with each other, in an emergency.

30 Claims, 12 Drawing Sheets

| CONTAINER INFORMATION | | | |
|---|---|---|---|
| NAME | ID NUMBER | POSITION | ADDRESS |
| AABCD | A00001 | 3-5-6 | 3 |
| ABDCD | A00002 | 4-7-3 | 4 |
| ... | ... | ... | ... |

COORDINATE TRANSFORMATION TABLE (51)

| ADDRESS | BOUNDARY COORDINATES | |
|---|---|---|
| | ONE END | OTHER END |
| 1 | 0 | 8 |
| 2 | 8 | 15 |
| 3 | 15 | 28 |
| 4 | 28 | 33 |
| ... | ... | ... |

FIG. 3B

SECTION-LENGTH TABLE (52)

| ADDRESS | LENGTH |
|---|---|
| 1 | 8 |
| 2 | 7 |
| 3 | 13 |
| 4 | 5 |
| ... | ... |

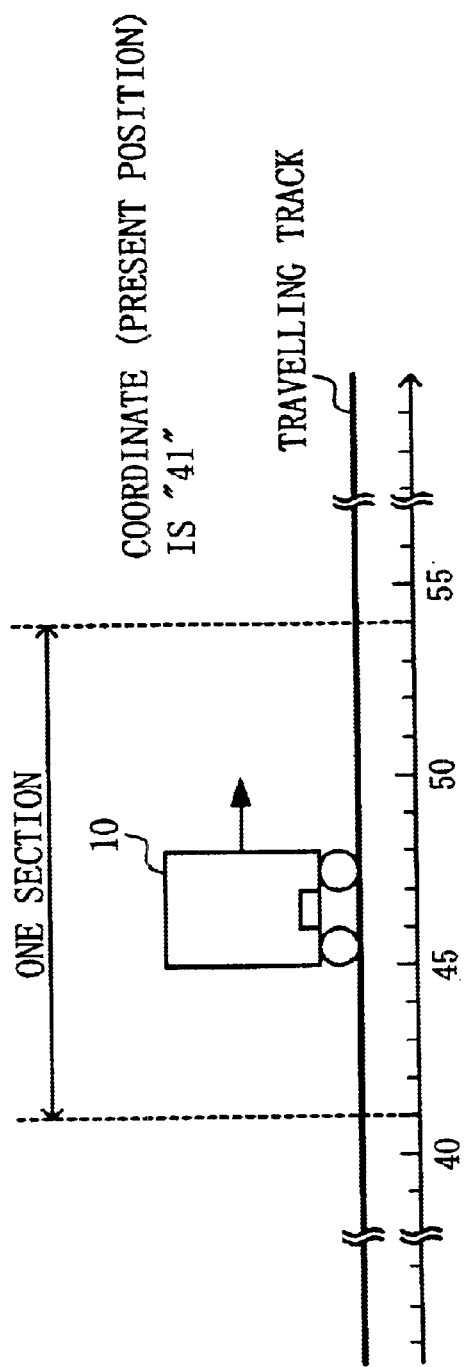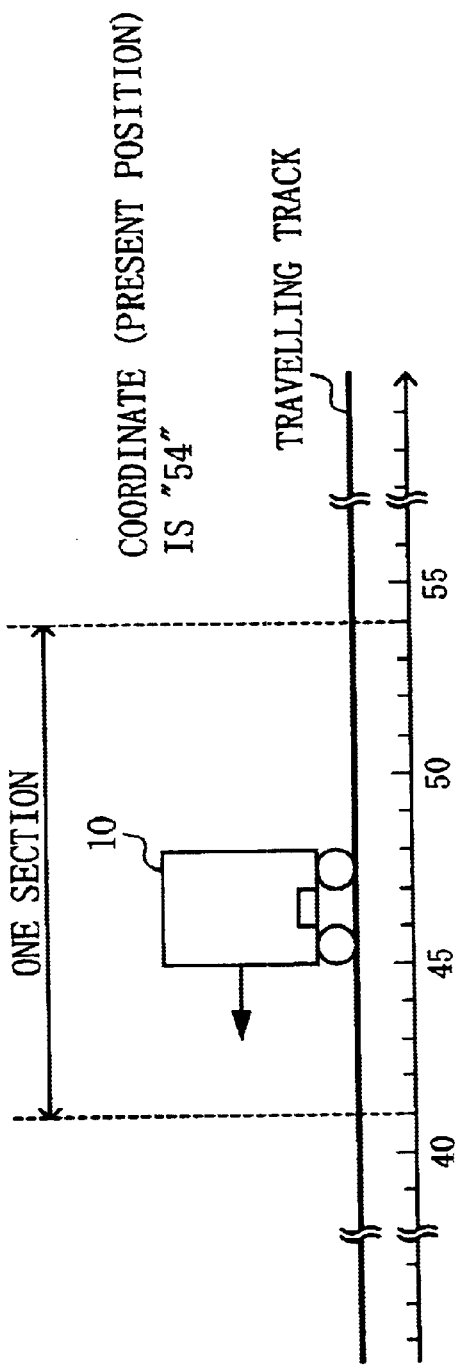
FIG. 6A
FIG. 6B

| PROCESS NUMBER (k) | PRESENT ADDRESS (N[k]) | PRESENT POSITION (X[k]) |
|---|---|---|
| ... | ... | ... |
| 3 | 4 | 28 |
| 4 | 5 | 33 |
| 5 | 5 | 33 |
| 6 | 6 | 40 |
| 7 | 6 | 40 |
| 8 | 7 | 50 |
| 9 | 8 | 56 |
| ... | ... | ... |

COLLISION AVOIDANCE SYSTEM, POSITION DETECTOR, COLLISION AVOIDANCE METHOD, POSITION DETECTING METHOD AND PROGRAM FOR REALIZING THE SAME

BACKGROUND OF THE INVENTION

1. Field of the Invention

The present invention relates to a system, method and program for avoiding a collision between movers. The present invention relates also to a system, method and program for detecting a position of a mover traveling (moving) on a traveling track.

2. Description of the Related Art

A plurality of movers included in a library system travel on the same travelling track. Hence, it is necessary to control the plurality of movers not to collide with each other.

A method of avoiding a collision between two movers travelling back and forth on the same travelling track (path) is disclosed in Unexamined Japanese Patent Application KOKAI Publication No. H3-100809. Particularly, according to the disclosed methods two movers are avoided colliding with each other, as will be described below.

A plurality of position indicators are arranged at equal intervals on the travelling track. A reader for reading the position indicators is installed in each of the movers. The reader reads the position indicators, at the time each mover passes each position indicator.

The position of each position indicator which is read by the reader is identified as a position of the mover. The position of the mover is updated every time the reader newly reads the position indicator.

The time period since the reader reads out a particular position indicator until it reads the next position indicator is measured. The velocity of the mover is obtained, based on the distance between the position indicators and the measured time.

Based on the position and velocity of each mover, it is determined whether there is a great chance of collision between two movers. In the case where it is determined that there is a great chance of collision therebetween, the two movers are stopped in an emergency According to this method, the collision of the movers may not successfully he avoided.

As explained above, the position and velocity of each mover is acquired every time the mover passes each position indicator. In other words, according to the above method, the position and velocity of the mover staying between two position indicators can not be obtained.

For example, the mover slows down near the its target point. In the case where the mover slows down, it takes quite a long time that the mover passes the next position indicator. The position and velocity of the mover can not be updated until it passes the next position indicator. Hence, the obtained position and velocity of the mover may be far from the actual position and velocity.

In this case, it is impossible to determine whether there is a great chance that two neighboring movers will collide with each other. According to the method disclosed in the publication, the collision between the movers can not successfully be avoided.

The entire contents of Unexamined Japanese Patent Application KOKAI Publication No. H3-100809 are incorporated herein by reference.

SUMMARY OF THE INVENTION

The present invention has been made in consideration of the above. It is accordingly an object of the present invention to provide a system, method and program for avoiding a collision between movers.

Another object thereof is to provide a system, method and program for detecting positions of movers travelling on a travelling track.

In order to attain the above objects, according to the first aspect of the present invention, there is provided a collision avoidance system which avoids a collision between a plurality of movers traveling on a path divided into sections of various lengths, the system comprising:

a position/velocity calculator which estimates a position and velocity for each of the plurality of movers based upon one of a first position and first velocity for each of the plurality of movers which passes a boundary between adjacent sections and a second position and second velocity for each of the plurality of movers which are traveling within any of the sections based upon a previous of the first position and first velocity for each of the plurality of movers which are traveling within any of the sections;

a collision-chance determiner which determines whether there is a chance that each two neighboring movers will collide with each other, using the estimates of position and velocity; and an emergency stopper which stops two neighboring movers when the collision-chance determiner determines that there is a chance of collision between the two neighboring movers.

According to this invention, the collision between the movers can be avoided.

The position/velocity calculator may include:

a boundary calculation unit which obtains the first position and first velocity of each of the plurality of movers in a case where each of the plurality of movers passes a boundary between the adjacent sections; and a section-calculation unit which obtains the second position and second velocity of each of the plurality of movers in any of the sections, based on a modeled movement, using the first position and first velocity obtained by the boundary calculation unit.

Each of the sections may be identified based on its address;

the collision avoidance system may further include an address detector which detects first addresses of the sections in which the plurality of movers are traveling; and an address-difference determiner which determines whether the first addresses detected by said address detector are different respectively from second addresses detected by said address detector a predetermined period ago, determines, in a case where it is determined that the first address is different from the second address, that any of the plurality of movers traveling in the section with the first address has passed a boundary between adjacent sections, and determines, in a case where it is determined that the first address is not different from the second address, that any of the plurality of movers is traveling in the section with the first address, the boundary calculation unit obtains the first position and first velocity of any of the movers traveling in the section with the first address, in the case where it is determined that the first address is different from the second address; and the section-calculation unit may obtain the second position and second velocity of any of the movers traveling in the section with the second address, in the case where it is determined that the first address is not different from the second address.

The movement may be expressed in a form of a model, wherein the mover travels with a constant velocity and slows down at a constant acceleration.

The movement may be expressed in a form of a model, wherein the mover accelerates at a constant acceleration, travels with a constant velocity and slows down at a constant acceleration.

The collision avoidance system may further include a memory unit which stores association information representing the address and boundary positions of each of the sections, in association each other; and the boundary calculation unit may include a position calculation unit which obtains, as a position of the mover, one of the boundary positions of the section in which the mover is traveling and having the first address, and a velocity calculation unit which obtains a velocity of the mover traveling in the section having the first address, by dividing a length of one of the plurality of sections which has the second address by a time period since said address-difference determiner determines that the first address is different from the second address until a next time the address-difference determiner determines that the first address is different from the second address.

The position calculation unit may obtain, as a position of the mover, one of the boundary positions that the mover has passed, of the boundary positions of the section in which the mover is traveling.

In order to attain the above objects, according to the second aspect of the present invention, there is provided a position detector comprising:

a first calculation unit which obtains a position and velocity of a mover traveling on a path divided into sections of various lengths, in a case where the mover passes a boundary between adjacent sections; and a second calculation unit which obtains a position of the mover traveling in any of the sections, using a previous position and velocity obtained by said first calculation unit.

According to this invention, the collision between movers can be avoided.

The second calculation unit may obtain the position of the mover traveling in any of the sections, based on a modeled movement, using the previous position and velocity obtained by said first calculation unit.

Each of the sections may be identified based on its address;

the position detector may further include an address detector which detects a first address of the section in which the mover is traveling, and an address-difference determiner which determines whether the first address detected by the address detector is different from a second address detected by the address detector a predetermined period ago, determines, in a case where it is determined that the first address is different from the second address, that the mover traveling in the section with the first address has passed a boundary between adjacent sections, and determines, in a case where it is determined that the first address is not different from the second address, that the mover is traveling in a section with the first address;

the first calculation unit may obtain the position and velocity of the mover traveling in the section with the first address, in the case where it is determined that the first address is different from the second address; and the second calculation unit may obtain the position of the mover traveling in the section with the second address, in the case where it is determined that the first address is not different from the second address.

The movement may be expressed in a form of a model, wherein the mover travels with a constant velocity and slows down at a constant acceleration.

The movement may be expressed in a form of model, wherein the mover accelerates at a constant acceleration, travels with a constant velocity and slows down at a constant acceleration.

The position detector may further include memory unit which stores association information representing the address and boundary positions of each of the sections, in association each other; and the first calculation unit may include a position calculation unit which obtains, as a position of the mover, one of the boundary positions of the section in which the mover is traveling and having the first address, and a velocity calculation unit which obtains a velocity of the mover traveling in the section having the first address, by dividing a length of one of the plurality of sections which has the second address by a time period since said address-difference determiner determines that the first address is different from the second address until a next time the address-difference determiner determines that the first address is different from the second address.

The position calculation unit may obtain, as a position of the mover, one of the boundary positions that the mover has passed, of the boundary positions of the section in which the mover is traveling.

In order to attain the above objects, according to the third aspect of the present invention, there is provided a collision avoidance method of avoiding a collision between a plurality of movers traveling on a path divided into sections of various lengths, said method comprising:

estimating a position and velocity for each of the plurality of movers based upon one of a first position and first velocity for each of the plurality of movers which a boundary between adjacent sections and a second position and second velocity for each of the plurality of movers which are traveling within any of the sections based upon a previous of the first position and first velocity for each of the plurality of movers which are traveling within any of the sections;

determining whether there is a chance that each two neighboring movers will collide with each other, using the estimates; and stopping two neighboring movers when there is a chance of collision between the two neighboring movers.

The estimating the position and velocity may include:

obtaining a previous first position and first velocity of each of the plurality of movers in a case where each of the plurality of movers passes the boundary between the adjacent sections; and obtaining the second position and second velocity of each of the plurality of movers in any of the sections, based on a modeled movement of a mover, using the previous first position and first velocity obtained in the case where each of the plurality of movers passes the boundary therebetween.

Each of the sections may be identified based on its address;

the collision avoidance method may further include detecting first addresses of the sections in which the plurality of movers are traveling, and determining whether the detected first addresses are different respectively from second addresses detected a predetermined period ago, determining, in a case where it is determined that the first address is different from the second address, that any of the plurality of movers traveling in the section with the first address has passed a boundary between adjacent sections, and determining, in a case where it is determined that the first address is not different from the second address, that any of the plurality of movers is traveling in the section with the first address;

the obtaining the first position and first velocity of each of the plurality of movers may include obtaining the first position and first velocity of any of the movers traveling in the section with the first address, in the case where it is determined that the first address is different from the second address; and the obtaining the second position and second velocity of each of the plurality of movers based on the modeled movement may include obtaining the second position and second velocity of any of the movers traveling in the section with the second address, in the case where it is determined that the first address is not different from the second address.

The movement may be expressed in a form of a model, wherein the mover travels with a constant velocity and slows down at a constant acceleration.

The movement may be expressed in a form of a model, wherein the mover accelerates at a constant acceleration, travels with a constant velocity and slows down at a constant acceleration.

The collision avoidance method may further include storing association information representing the address and boundary positions of each of the sections, in association each other; and the obtaining the first position and first velocity may include obtaining, as a position of the mover, one of the boundary positions of the section in which the mover is traveling and having the first address, and obtaining a velocity of the mover traveling in the section having the first address, by dividing a length of one of the plurality of section which has the second address by a time period since it is determined that the first address is different from the second address until it is determined that the first address is different from the second address.

The obtaining, as the position of the mover, the one of the boundary positions of the section may include obtaining, as a position of the mover, one of the boundary positions that the mover has passed, of the boundary positions of the section in which the mover is traveling.

In order to attain the above objects, according to the fourth aspect of the present invention, there is provided a position detecting method comprising:

obtaining a first position and first velocity of a mover traveling on a path divided into sections of various lengths, in a case where the mover passes a boundary between adjacent sections; and obtaining a second position and second velocity of the mover includes obtaining a position of the mover traveling in any of the sections, using a previously obtained first position and first velocity.

The obtaining the second position and second velocity of the mover may include obtaining a position of the mover traveling in any of the sections, based on a modeled movement of the mover, using the previously obtained first position and first velocity.

Each of the sections may be identified based on its address;

the position detecting method may further include detecting a first address of the sections in which the mover is traveling, and determining whether the detected first address is different from a second address detected a predetermined period ago, determining, in a case where it is determined that the first address is different from the second address, that the mover traveling in the section with the first address has passed a boundary between adjacent sections, and determining, in a case where it is determined that the first address is not different from the second address, that the mover is traveling in the section with the first address;

the obtaining the first position and first velocity of the mover may include obtaining the first position and first velocity of the mover traveling in the section with the first address, in the case where it is determined that the first address is different from the second address; and the obtaining the second position and second velocity of the mover may include obtaining the second position and second velocity of the mover traveling in the section with the second address, in the case where it is determined that the first address is not different from the second address.

The movement may be expressed in a form of a model, wherein the mover travels with a constant velocity and slows down at a constant acceleration.

The movement may be expressed in a form of a model, wherein the mover accelerates at a constant acceleration, travels with a constant velocity and slows down at a constant acceleration.

The position detecting method may further include storing association information representing the address and boundary positions of each of the sections, in association each other; and the obtaining then first position and first velocity of the mover may include;

obtaining, as the first position of the mover, one of the boundary positions of the section in which the mover is traveling and having the first address, using the association information, and obtaining the first velocity of the mover traveling in the section having the first address, by dividing a length of one of the plurality of sections which has the second address by a time period since it is determined that the first address is different from the second address until it is determined that the first address is different from the second address.

The obtaining, as a position of the mover, the one of the boundary positions of the section may include obtaining, as a position of the mover, one of the boundary positions that the mover has passed, of the boundary positions of the section in which the mover is traveling.

In order to attain the above objects, according to the fifth aspect of the present invention, there is provided a program for controlling a computer to function as a collision avoidance system which avoids a collision between a plurality of movers traveling on a path divided into sections of various lengths, said system comprising:

a position/velocity calculator which estimates a position and velocity of each of the plurality of movers based upon one of a first position and first velocity for each of the plurality of movers which passes a boundary between adjacent sections and a second position and second velocity for each of the plurality of movers which are traveling within any of the sections based upon a previous of the first position and first velocity for each of the plurality of movers which are traveling within any of the sections;

a collision-chance determiner which determines whether there is a chance that each two neighboring movers will collide with each other, using the estimates; and an emergency stopper which stops two neighboring movers that the collision-chance determiner determines that there is a chance of collision between the two neighboring movers.

In order to attain the above objects, according to the sixth aspect of the present invention, there is provided a program for controlling a computer to function as a position detector comprising:

a first calculation unit which obtains a position and velocity of a mover traveling on a path divided into sections of various lengths, in a case where the mover passes a boundary between adjacent sections; and a second calculation unit which obtains a position of the mover traveling in any of the sections, using a previous position and velocity obtained by the first calculation unit.

BRIEF DESCRIPTION OF THE DRAWINGS

These objects and other objects and advantages of the present invention will become more apparent upon reading of the following detailed description and the accompanying drawings in which;

FIG. 2 is a diagram showing container information stored in a mover controller included in the collision avoidance system of FIG. 1;

FIG. 3A is a diagram showing a coordinate transformation table stored in a memory unit included in the collision avoidance system of FIG. 1, and FIG. 3B is a diagram showing a section-length table stored in the memory unit;

FIGS. 6A and 6B are diagrams showing that different coordinates are transformed based on the same address, depending on the travelling direction of a mover;

DETAILED DESCRIPTION OF THE PREFERRED EMBODIMENT

A collision avoidance system according to a preferred embodiment of the present invention will now be depicted with reference to the accompanying drawings.

The collision avoidance system avoids a collision between a plurality of movable objects (movers) which are movable on the same travelling track.

A library system will now be explained as an example system of the collision avoidance system.

The library system includes a container, containing a plurality of objects to be contained therein (e.g. a magnetic recording medium including a magnetic tape, an optical recording medium including a compact disk, etc.), and a plurality of movers travelling on a pre-set travelling track and retrieving an object specified by a user, etc. The travelling track is divided into sections of various lengths, in accordance with the arrangement of the container. Each of the sections is identified using an address assigned thereto.

Figure 1:
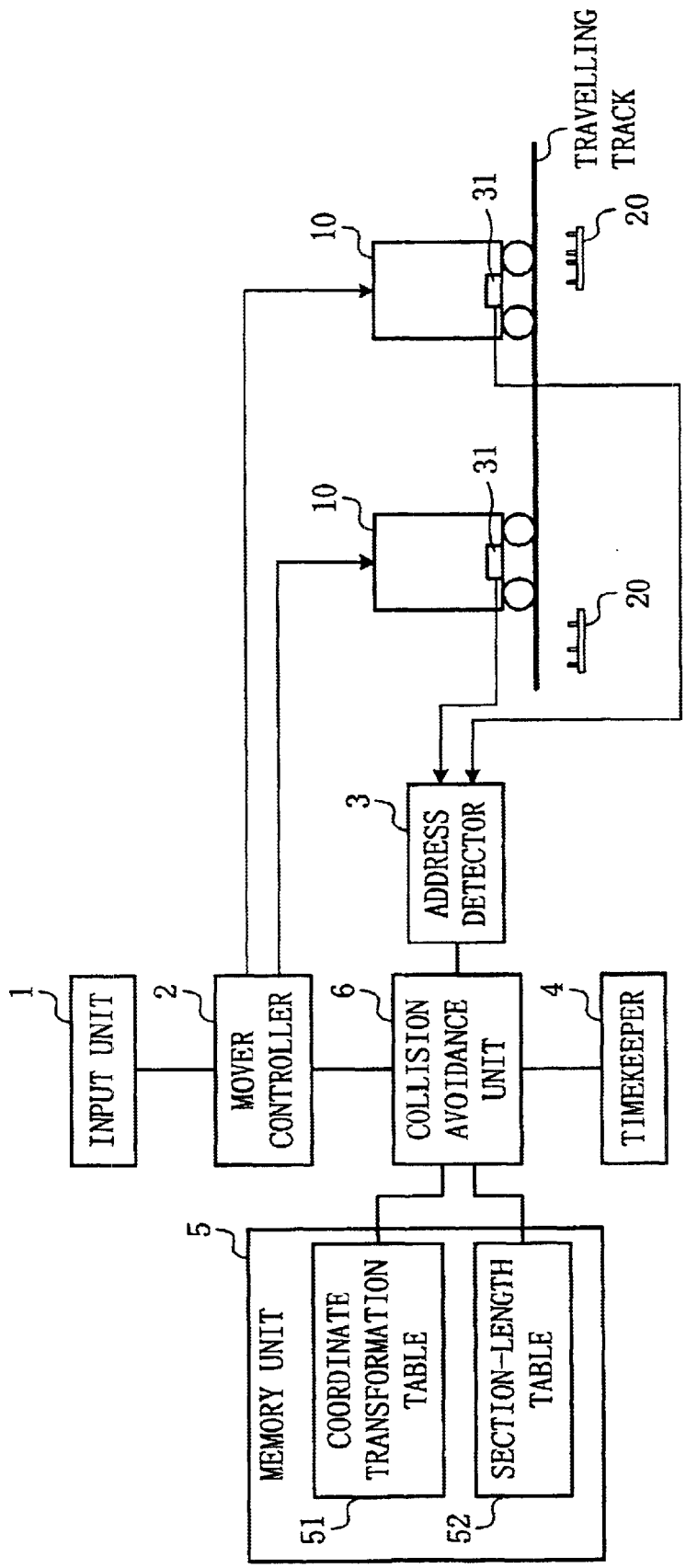
FIG. 1 is a diagram showing the structure of a collision avoidance system according to an embodiment of the present invention.

The collision avoidance system comprises, as shown in FIG. 1, an input unit 1, a mover controller 2, an address detector 3, a timekeeper 4, a memory unit 5, and a collision avoidance unit 6.

The input unit 1 includes a keyboard, a mouse, or a touch-panel and is operated by the user, etc. The user, etc. operates the input unit 1, and inputs the name or an ID number of an object to be taken out from the container. The input unit 1 then outputs a take signal representing the name or if number of the object to be taken out, to the mover controller 2.

The mover controller 2 comprises a RAM (Random Access Memory), a ROM (Read Only Memory) and a CPU (Central Processing Unit), and stores a program and (data for controlling a plurality of movers 10. The mover controller 2 controls the movers 10 in accordance with the stored program and data, so as to take out the object specified by the user from the container.

For example, the mover controller 2 stores container information, shown in FIG. 2, representing the name, ID number and position of each contained object in the container and representing also an address indicating a section of the travelling track which corresponds to the position thereof. The mover controller 2 determines the position and address of the contained object, having the name or ID number specified by the take signal sent from the input unit 1, using the stored container information. The determined address is set as a target address indicating a destination section of a mover 10. The mover controller 2 controls the mover 10 to travel to the section which is assigned the target address, and takes out the contained object from the determined position.

The address detector 3 has a plurality of sensors 31 which are respectively set in the movers 10, and detects addresses of sections in which the movers 10 are travelling, using the sensors 31. Each of the sensors 31 reads out addresses shown by address plates 20 which are set along die travelling track, using an infrared ray or laser beam, etc. The address plates 20 are plates having a plurality of protrusions on its surface. At least one of the address plates 20 is set in each section. The address is expressed by the number and intervals of the protrusions.

The timekeeper 4 keeps the device time defined in the collision avoidance system.

The memory unit 5 includes a hard disk, RAM or ROM, etc., and stores a coordinate transformation table 51 and a section-length table 52.

The coordinate transformation table 51 shows, as shown in FIG. 3A, section addresses and boundary coordinates (coordinates of one end and the other end of each section) of sections, in association with each other The coordinates are defined based on a reference point (e.g. one end of the travelling track) of the travelling track.

The section-length table 52 shows, as shown in FIG. 3B, section addresses and their lengths, in association with each other.

Figure 4:
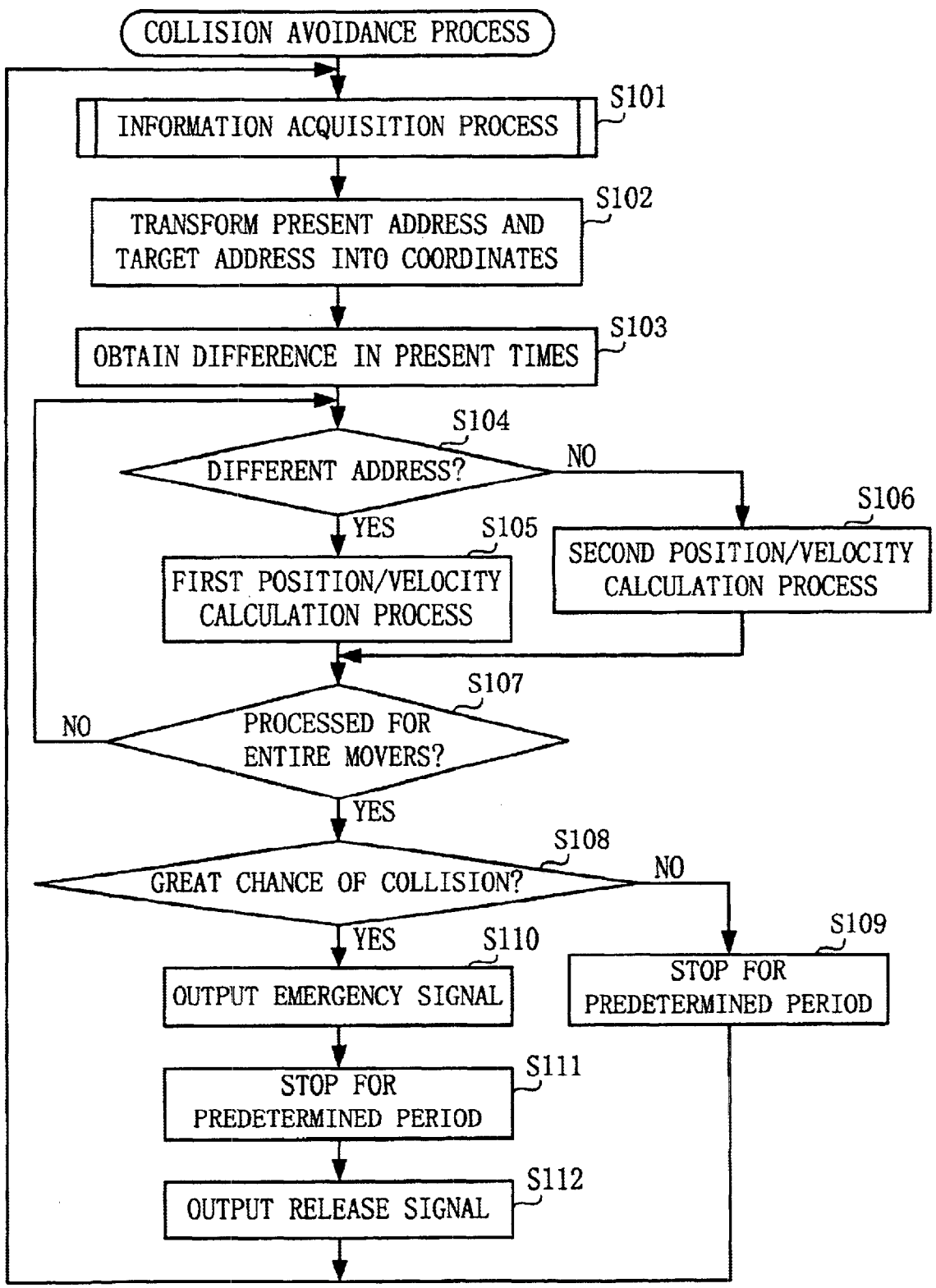
FIG. 4 is a flowchart showing a collision avoidance process that is carried out by a collision avoidance unit included in the collision avoidance system of FIG. 1.

The collision avoidance unit 6 comprises a RAM, ROM and CPU, and stores a program and data for avoiding a collision between the movers 10. The collision avoidance unit 6 controls operations of each unit included in the collision avoidance system in accordance with the stored program and data The collision avoidance unit 6 prevents the collision between the movers 10. A collision avoidance method will now specifically be described FIG. 4 is a flowchart showing a collision avoidance process, which is carried out by the collision avoidance unit 6.

The collision avoidance unit 6 executes the collision avoidance process, so as to obtain the position and velocity of each of the movers 10 and determine whether the movers 10 will collide with each other, using the obtained the positions and velocities of the movers.

The collision avoidance unit 6 carries out an information acquisition process (Step S101). By performing this process, the collision avoidance unit 6 acquires information necessary for executing the collision avoidance process.

Figure 5:
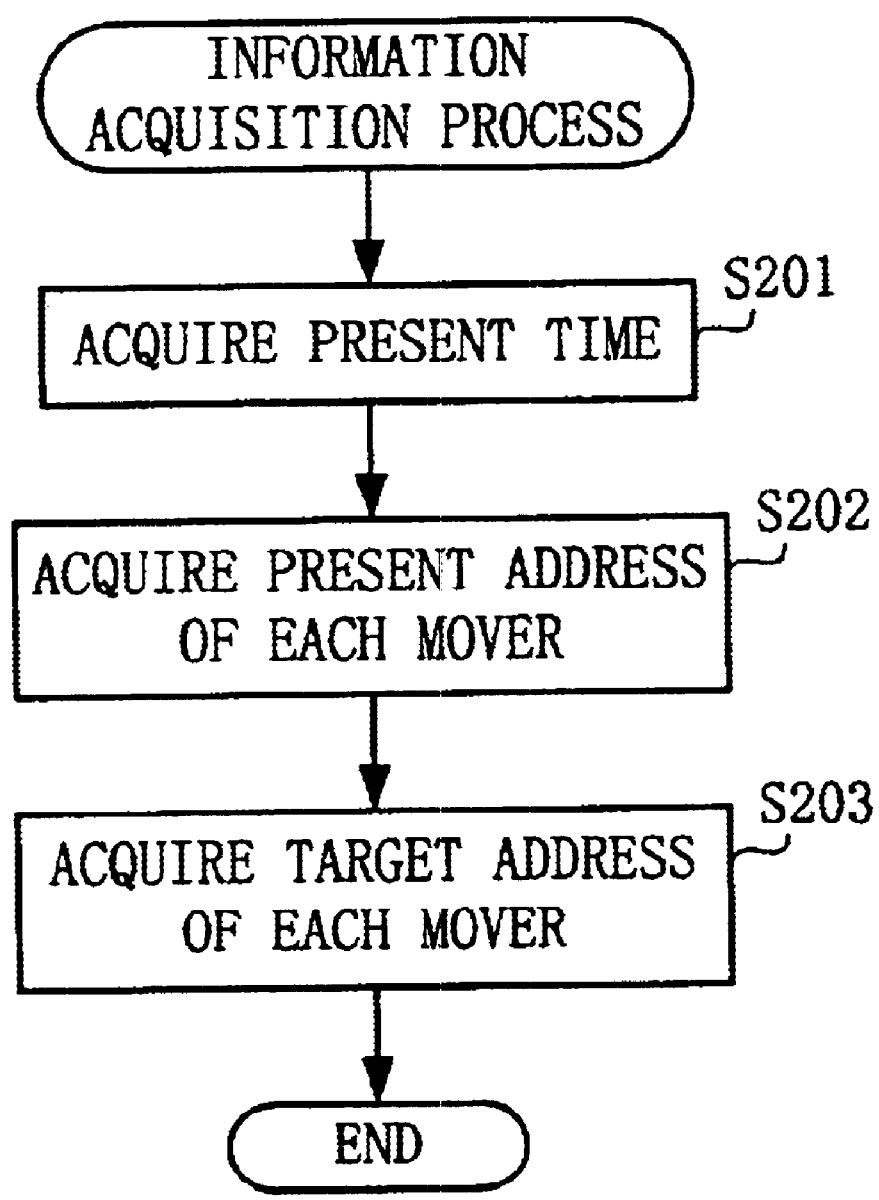
FIG. 5 is a flowchart showing all information acquisition process included in the collision avoidance process of FIG. 4.

Specifically, as illustrated in FIG. 5, die collision avoidance unit 6 acquires the present time (the present device time) from the timekeeper 4 (Step S201).

Subsequently, the collision avoidance unit 6 acquires an address (the present address) of a section in which each of the movers 10 travels, frown the address detector 3 (Step S202).

The collision avoidance unit 6 acquires a target address of a destination section of each mover 10, from the mover controller 2 (Step S203), and executes the procedure of the step S102.

The collision avoidance unit 6 transforms the obtained present address and target address of each mover 10 into coordinates (Step S102). Note that the coordinate obtained by transforming the present address is set as a present position of the mover 10, while the coordinate obtained by the transforming the target address is set as a target position indicating the destination of the mover 10. The target position is a position (a coordinate) where the mover 10 having reached the section with the target address stops, and is set in advance based on the arrangement of the container. For example, the intermediate coordinate of the boundary coordinates are set as the target position.

Particularly, the transformation method may differ, depending on whether the mover 10 is travelling and based on the travelling direction thereof. The collision avoidance unit 6 determines whether the mover 10 is travelling in accordance with whether the present address and the target address ate the same. The collision avoidance unit 6 determines the travelling direction of the mover 10, in accordance with which of the present address and the target address is larger than the other.

In the case where it is determined that the mover 10 stops, the collision avoidance unit 6 transforms both of the present address and the target address into target positions, using the coordinate transformation table 51 stored in the memory unit 5. That is, the present position coincides with the target position.

In the case where it is determined that the mover 10 is travelling, the collision avoidance unit 6 transforms the present address and the target address into coordinates, using the coordinate transformation table 51 stored in the memory unit 5.

As explained above, the coordinate transformation table 51 shows a coordinate of one end of each section and a coordinate of the other end thereof The collision avoidance unit 6 transforms the present address into either the one coordinate or the other coordinate of a section, in accordance with the travelling direction of the mover 10.

Let it be assumed that the coordinate axis is set in the direction in which the address values get larger. Hereinafter, the forward direction of the coordinate axis is called to as a positive direction, while the backward direction thereof is called to as a negative direction.

In the case where the target address is larger than the present address, the collision avoidance unit 6 determines that the mover 10 is travelling in the positive direction. In the case where the target address is smaller than the present address, the collision avoidance unit 6 determines that the mover 10 is travelling in the negative direction.

In the case where it is determined that the mover 10 is travelling in the positive direction, the collision avoidance unit 6 transforms the present address into a smaller one of the boundary coordinates, as shown in. FIG. 6A. On the contrary, in the case where it is determined that the mover 10 is travelling in the negative direction, the collision avoidance unit 6 transforms the present address into a larger one of the boundary coordinates, as shown in FIG. 6B.

As explained above, the collision avoidance unit 6 sets the present position of each mover 10 based on the present address thereof and sets the target position based on the target address.

After this, the collision avoidance unit 6 obtains a difference between the present time acquired in the step S101 performed just before the current process and the present time acquired in the current step S101 (Step S103) As will be explained later, the collision avoidance unit 6 repeatedly carries out the procedures of the steps S101 to the steps S112 at predetermined intervals. For example, each of the predetermined intervals is set shorter than a period of time in which the mover 10 passes the shortest section.

Subsequently, the collision avoidance unit 6 selects one target mover 10 to be processed The collision avoidance unit 6 determines whether the present address acquired in the step S101 performed just before the current process differs from the present address acquired in the current step S101, for the selected mover 10 In other words, the collision avoidance unit 6 determines whether the different present address has been acquired (Step 8104).

In the case where it is determined that the different present address has been acquired (Step S110; YES), the collision avoidance unit 6 performs the fast position/velocity calculation procedure for the target mover 10 (Step S105). The contents of the first position/velocity calculation procedure will be described in more detail later.

On the contrary, in the case where it is determined that the different present address (Step S104; NO), the collision avoidance unit 6 performs the second position/velocity calculation procedure for the target mover 10 (Step S106). The contents of the second position/velocity calculation procedure will be described in more detail later.

After this, the collision avoidance unit 6 determines whether the above procedures are performed for the entire movers 10 (Step S107).

In the case where it is determined that the above procedures are not done for the entire movers 10 (Step S107; NO), the flow returns to the procedure of the step S104. The collision avoidance unit 6 then performs the procedures for any of the movers 10 for which the procedures are not done yet.

On the contrary, in the case where it is determined that the above procedures are done for the entire movers 10 (Step S107, YES), the collision avoidance unit 6 determines whether there is a great chance that each pair of neighboring two movers 10 will collide with each other, using results obtained in the steps S105 and S106 (Step S108). A method of determining whether each pair of neighboring two movers 10 will collide with each other will be described in more detail later.

In the case where it is determined that there is almost no chance that each pair of neighboring two movers 10 will collide with each other (Step 8108), the collision avoidance unit 6 does not carry out the collision avoidance process for a predetermined period of time (Step S109). After the predetermined period of time elapsed, the flow advances to the procedure of the step S101, and the collision avoidance unit 6 performs the abovedescribed procedures.

On the contrary, in the case where it is determined that there is a great chance that a pair of neighboring movers 10 will collide with each other (Step S108; YES), the collision avoidance unit 6 outputs an emergency signal for stopping the pair of neighboring movers 10 in an emergency, to the mover controller 2 (Step S410). In response to this emergency signal, the mover controller 2 stops the pair of neighboring movers 10 in an emergency.

After this, the collision avoidance unit 6 does not carry out the collision avoidance process for a predetermined period of time (Step S111). During this period, the mover controller 2 may move one or both of the pair of neighboring movers 10 which have been stopped in an emergency, thereby to avoid the chance of the collision.

After the predetermined period of time elapsed, the collision avoidance unit 6 outputs a release signal for releasing the stoppage of the movers 2, to the mover controller 2 (Step S112). In response to the provided release signal, the mover controller 2 moves the stopped movers 10 again.

Then, the flow returns to the step S101, and the collision avoidance unit 6 performs the above procedures.

Explanations will now be made to the first position/velocity calculation procedure of the step S105, the second position/velocity calculation procedure of the step S106 and the method of determining whether there is a great chance of collision in the step S108.

The number of times tie collision avoidance process is performed is expressed by a parameter "k", while the time difference $\Delta T[k]$ which is obtained in the procedure of the step S103 of a "k"-th collision avoidance process can be derived by Equation (1).

$$\Delta T[k]=t[k]-t[k-1] \tag{1}$$

where t[k] expresses the present time acquired in the "k"-th step S101.

In the following explanations, N[k] expresses the present address, NT expresses the target address, X[k] expresses the present position, and XT expresses the target position.

(i) First Position/Velocity Calculation Procedure (Step S105).

As explained above, the collision avoidance unit 6 performs the first position/velocity calculation procedure, in the case where the different present address has been acquired. In other words, in the case where $N[k] \neq N[k-1]$ In a "k"-th collision avoidance process, the collision avoidance unit 6 carries out the first position/velocity calculation procedure.

Figures 7A, 7B:
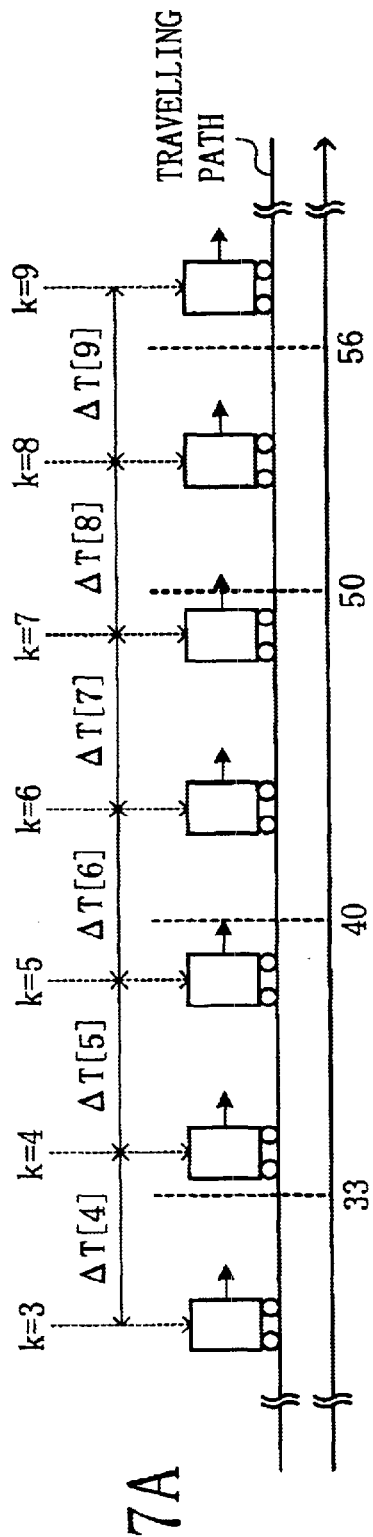
FIG. 7A is a diagram showing the movement or the mover, end
FIG. 7B is a diagram showing the present address and present position of the mover which are obtained based on the movement thereof.

In the examples shown in FIGS. 7A and 7B, it is determined that the different present address has been acquired in the fourth, sixth, eighth and ninth collision avoidance processes and the first position/velocity calculation procedure is executed.

Specifically, the collision avoidance unit 6 obtains the velocity V[k] of the target mover 10, using Equation (2).

$$V[k]=(X[k]-X[j])/\Sigma_{i=j+1}^{k}\Delta T[i]) \tag{2}$$

where $\Sigma_{i=j+1}^{k}\Delta T[i]=\Delta T[j+1]+\Delta T[j+2]+ \ldots +\Delta T[k]$.

Note that, of the collision avoidance processes wherein it is determined that the different present address is acquired, "j" (j<k) expresses the last time the collision avoidance process performed the first position/velocity calculation process of step S104.

Even if the number of "k" changes, as long as the same present address is acquired, the same present position is acquired as well. For example, in FIGS. 7A and 7B, the present address N[4] obtained in the fourth collision avoidance process is the same as the present address N[5] obtained in the fifth collision avoidance process, the present position X[4] obtained in the fourth collision avoidance process is also the same as the present position X[5] obtained in the fifth collision avoidance process. Hence, if the present position X[5] is referred for obtaining the velocity V[6], the obtained velocity V[6] would be quite far from the actual velocity.

To avoid this, employed is the present position X[4] which is obtained in the process performed just before the sixth collision avoidance process, i.e. in the "j=4"-th collision avoidance process, of the collision avoidance processes wherein it is determined that the different present address has been acquired. By employing this present position X[4], the velocity V[6] which is quite approximate to the actual velocity can be derived by Equation (3).

$$V[6]=(X[6]-X[4])/(\Delta T[5]+\Delta T[6]) \tag{3}$$

Accordingly, the velocity V[k] of the target mover 10 can be obtained.

As explained above, the present position X[k] which can be obtained using the present address N[k] is one of the boundary coordinates of the section in which the mover is travelling. Hence, it can be assumed that the present position X[k], which is obtained in the case where the different present address N[k] has been acquired, i.e., in the case where the mover 10 passed the boundary, is the actual position of the mover 10. Similarly, the present velocity V[k] which can be obtained using X[k] and X[j] which are obtained when the mover 10 has gone beyond the boundary is the actual velocity of the mover 10.

Accordingly, the collision avoidance unit 6 sets the present position X[k] and the velocity V[k] of the target mover 101 respectively as an estimated position Xe[k] and estimated velocity Ve[k] based on which it is determined whether there is a great chance that the neighboring movers 10 will collide with each other in the step S108.

Specifically, the estimated position Xe[k] is set by Equation (4), and the estimated velocity Ve[k] is set by Equation (5)

$$Xe[k]=X[k] \quad (4)$$

$$Ve[k]=V[k] \quad (5)$$

Subsequently, the collision avoidance unit 6 updates the value of "j". For example, after the collision avoidance unit 6 obtains V[6], it updates the value of "j" from 4 to 6. In the eighth collision avoidance process wherein the different present address has been acquired, X[7] is not used but X[6] is used, as shown in Equation (6).

$$V[8]=(X[8]-X[6])/(\Delta T[7]+\Delta T[8]) \quad (6)$$

Now, the collision avoidance unit 6 completes the first position/velocity calculation procedure, and go on to the procedure of the step S107.

(ii) Second Position/Velocity Calculation Procedure (Step S106)

As explained above, the collision avoidance unit 6 performs the second position/velocity calculation procedure, in the case where it is determined that the same present address is acquired. In other words, in the case where N[k]=N[k −1] in the "k"-th collision avoidance process, the collision avoidance unit 6 carries out the second position/velocity calculation process.

As explained above, the present position X[k] obtained using the present address N[k] is one of the boundary coordinates of the section in which the mover 10 is travelling. Hence, the present position X[k], which is obtained in the case where the same present address N[k] has been acquired i.e. in the case where the mover 10 passes halfway through the section, may be quite far from the actual position thereof. Hence, as will be explained later, the collision avoidance unit 6 obtains the position and velocity of the mover 10 travelling halfway through the section, on the basis of the estimated position Xe[k] and the estimated velocity Ve[k] which are obtained in the first position/velocity calculation process.

Figure 8:
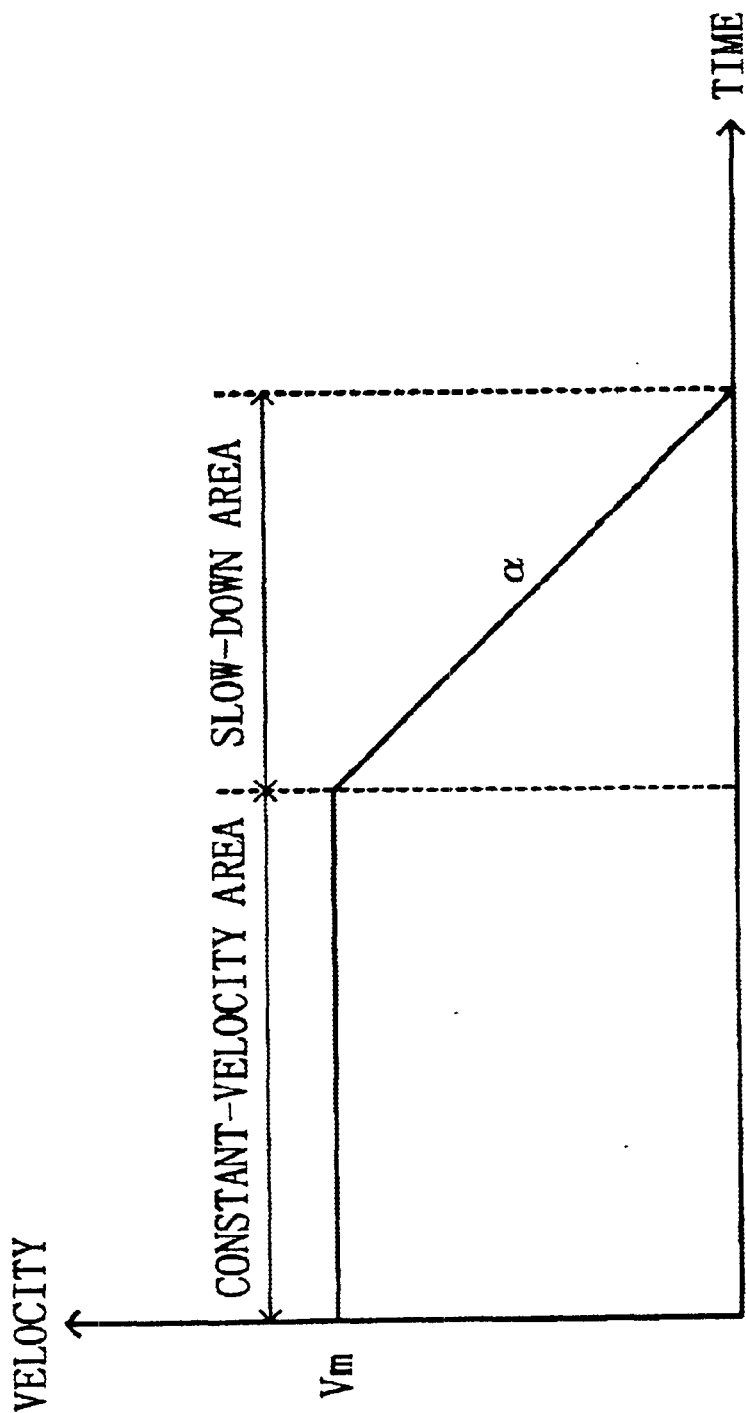
FIG. 8 is a diagram showing the modeled movement of the mover.

To execute the second position/velocity calculation procedure, the movement of the mover 10 is modeled as shown in FIG. 8. Specifically, the mover 10 travels at a constant velocity Vm in a constant-velocity area and slows down at an acceleration α in a slow-down area. The acceleration α is positive in the negative direction.

The collision avoidance unit 6 obtains the velocity and position of the target mover 10 traveling within, the section, based on the movement model of FIG. 8.

The collision avoidance unit 6 determines whether the target mover 10 is travelling in the constant-velocity area or slow-down area. Specifically, the collision avoidance unit 6 determines whether Condition (7) can be satisfied, thereby to determine whether the target mover 10 is travelling in the constant-velocity area or slow-down area.

$$|XT-Xe[k-1]|<Vm^2/(2\alpha) \quad (7)$$

Figure 9:
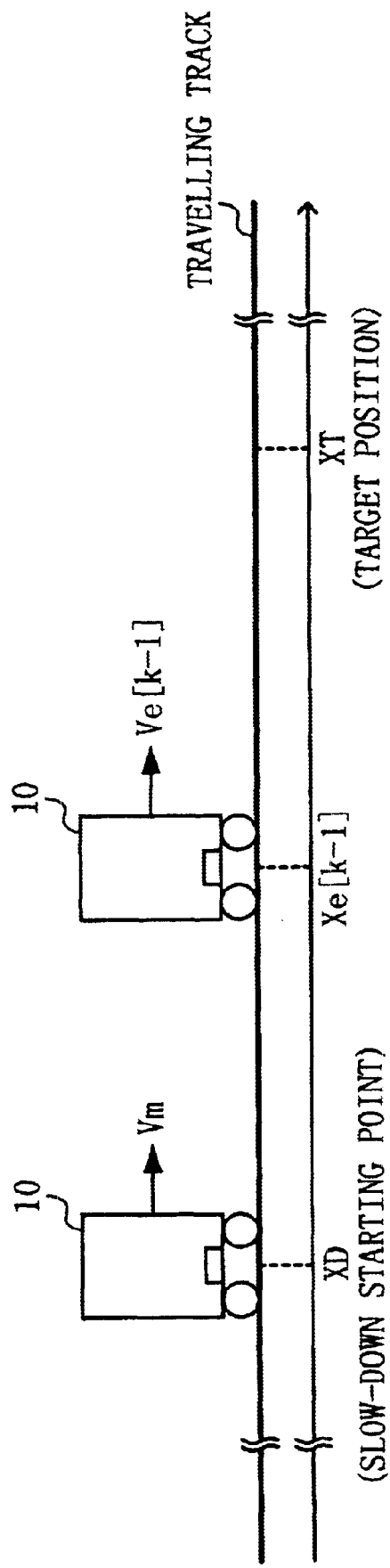
FIG. 9 is a diagram showing the relationship among a slow-down starting position, a target position and the position of the mover in a slow-down area.

As shown in FIG. 9, Condition (7) can be obtained, since the distance between the estimated position Xe[k−1] acquired in the "k−1"-th collision avoidance process and the target position XT is shorter than the distance between the slowdown, starting position XD or the mover 10 and the target position XT, in the slow-down area.

In the case where the Condition (7) can not be satisfied, the collision avoidance unit 6 determines that the target mover 10 is travelling in the constant-velocity area On the contrary, in the case where the Condition (7) is satisfied, the collision avoidance unit 6 determines that the target mover 10 is travelling in the slow-down area In the case where it is determined that the collision avoidance unit 6 is travelling in the constant-velocity area, the collision avoidance unit 6 obtains the estimated position Xe[k] using Equation (8) and the estimated velocity Ve[k] using Equation (9), as will be described below.

$$Xe[k]=Xe[k-1]+Ve[k-1]\Delta T[k] \quad (8)$$

$$Ve[k]=Vm \quad (9)$$

On the contrary, in the case where it is determined that the collision avoidance unit 6 is travelling in the slowdown area, he collision avoidance unit 6 obtains the estimated position Xe[k] using Equation (10) and the estimated velocity Ve[k] using Equation (11), as will be described below.

$$Xe[k]=Xe[k-1]+(Ve[k-1]-\alpha\Delta T[k]/2)\Delta T[k] \quad (10)$$

$$Ve[k]=Ve[k-1]-\alpha\Delta T[k] \quad (11)$$

In the case where the second position/velocity calculation process is performed once or more, the estimated position Xe[k−1] and the estimated velocity Ve[k−1] which are obtained in the first position/velocity calculation process are used in the second position/velocity calculation process to he performed at the first time. In the second position/velocity calculation process to be performed at the second time or after, the estimated position Xe[k−1] and the estimated velocity Ve[k−1] which are obtained in the previous second position/velocity calculation process are used In the examples of FIGS. 7A and 7B, in the case where to obtain the estimated position Xe[7] and the estimated velocity Ve[7] in the second position/velocity calculation process, the estimated position Xe[6] and the estimated velocity Ve[6] obtained in the first position/velocity calculation process are used.

Accordingly, the collision avoidance unit 6 obtains the estimated position Xe[k] and estimated velocity Ve[k] of the mover 10 traveling halfway through the section, using the estimated position and the estimated velocity obtained in the first position/velocity calculation process for the first time the second process is used and the second nrocess for subsequent times, based on the movement model.

Note, however, that the second position/velocity calculation process is performed, in the case where it is determined that the same present address has been acquired, i.e. N[k]=N[k−1]. The collision avoidance unit 6 acquires the length of a section which is assigned an address N[k] (−N[k−1]) from the section-length table 52 of the memory unit 5, and sets Xe[k] in the range that. |Xe[k]−Xe[j]|≦L can be satisfied.

Now, the collision avoidance unit 6 completes the second position/velocity calculation process and executes the procedure of the step S107.

Accordingly, in the case where the different present address has been acquired, the position and velocity of the mover 10 can be obtained using the present address and the present position acquired from the coordinate transformation table 51. On the contrary, in the case where the same present address has been acquired, the position and velocity of the mover 10 can be obtained based on the movement model of the mover 10, with reference to the position and velocity obtained in the case, where the different present address has been acquired.

(iii) Method of Determining Whether There is a Great Chance of Collision (S108)

The collision avoidance unit 6 determines whether there is a great chance of collision between each pair of neighboring movers 10, using the estimated position Xe[k] and the estimated velocity Ve[k] acquired in the first and second position/velocity calculation processes.

Figure 10A:
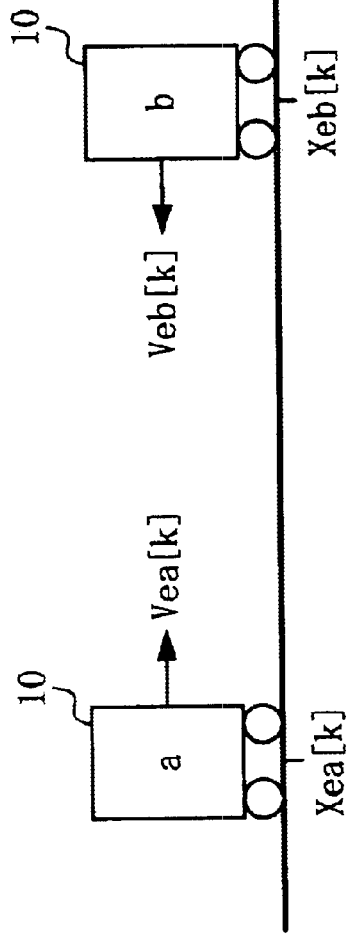
FIG. 10A is a diagram showing the state wherein two movers approach each other.

It is determined that there is a great chance of collision therebetween; (a) in the case where two neighboring movers 10 are approaching each other (FIG. 10A); (b) in the case where travelling in the same direction (FIG. 10B); or in the case where one mover 10 is approaching the other mover 10 which is being stopped (FIG 10C) Other than the above three cases, there is no chance that the two neighboring movers 10 will collide with each other To determine whether there is a great chance of the collision, the movement of the 10 movers 10 is modeled as shown in FTC. 11. Specifically, the mover 10 travelling with a velocity of Ve[k] slows down at an acceleration β, thereby to stop in an emergency. The acceleration β is positive in the negative direction.

The collision avoidance unit 6 determines whether there is a chance that each pair of neighboring movers 11 will collide with each other, based on the above movement model.

In the following explanations, to distinguish between each pair of the neighboring movers 10, the position and velocity or a mover 10 on the left hand side of the illustration are expressed with an alphabetical symbol "a", while the position and velocity of a mover 10 on the right hand side of the illustration are expressed with an alphabetical symbol "b".

(a) In the Case Where Two Neighboring Movers 10 are Approaching Each Other (FIG. 10A)

The collision avoidance unit 6 determines that there is a great chance of collision between a pair of neighboring movers 10, in the case where Condition (12) is satisfied.

$$(Xea[k]+Vca[k]^2/(2\beta))+d>Xeb[k]\cdot Veb[k]^2/(2\beta) \qquad (12)$$

Xea[k]+Vea[k]²/(2β) expresses the position where the left mover 10 stops in an emergency, and Xeb[k]−Veb[k]²/(2β) expresses the position where the tight mover 10 stops in an emergency The alphabetical symbol "d" expresses the buffer length, and is set in consideration of, for example, a time period since the collision avoidance unit 6 begins the calculation until the mover 10 actually begins to slow down.

Figure 10B:
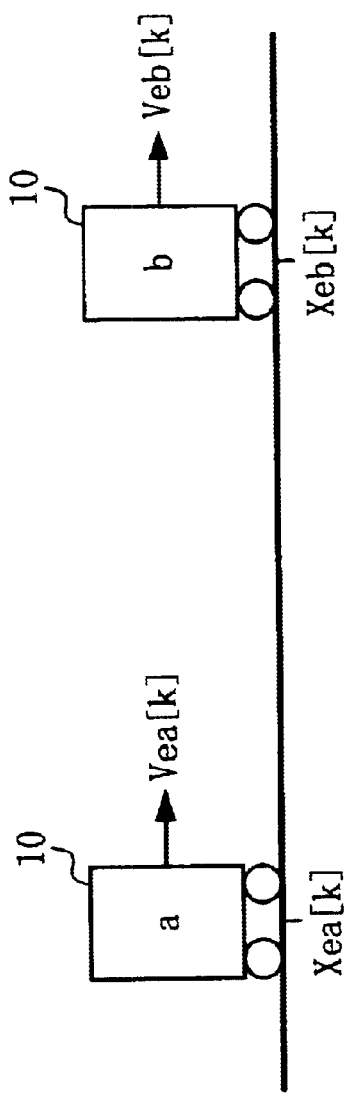
FIG. 10B is a diagram showing the state wherein the two movers travel in the same direction.

(b) In Case Where Two Neighboring Movers 10 Are Travelling in Same Direction (FIG. 10B)

In the case the following condition (13) or (14) is satisfied, tie collision avoidance unit 6 determined that there is a great chance that the neighboring movers 10 will collide with each other.

In the case where the two neighboring movers 10 are travelling in the positive direction, $$(Xea[k]+Vea[k]^2/(2\beta))+d>Xeb[k]+Veb[k]^2/(2\beta) \qquad (13)$$

In the case where the two neighboring movers 10 are travelling in the negative direction, $$(Xea[k]-Vea[k]^2/(2\beta))+d>Xeb[k]-Veb[k]^2/(2\beta) \qquad (14)$$

Figure 10C:
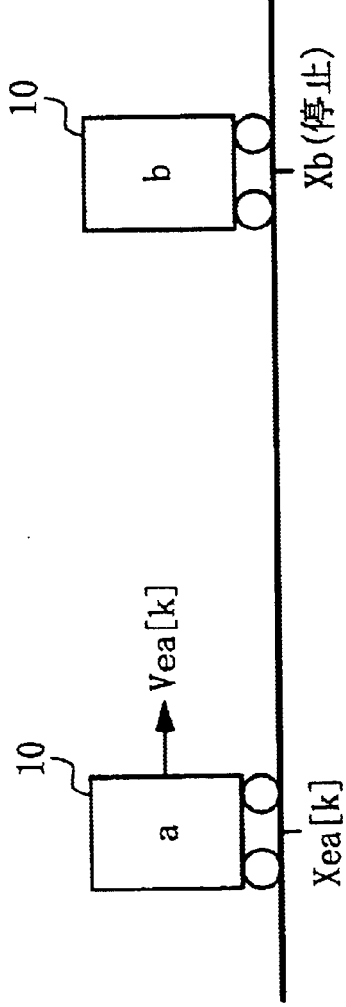
FIG. 10C is a diagram showing the state wherein one mover is approaching the other mover which is being stopped to travel.
Figure 11:
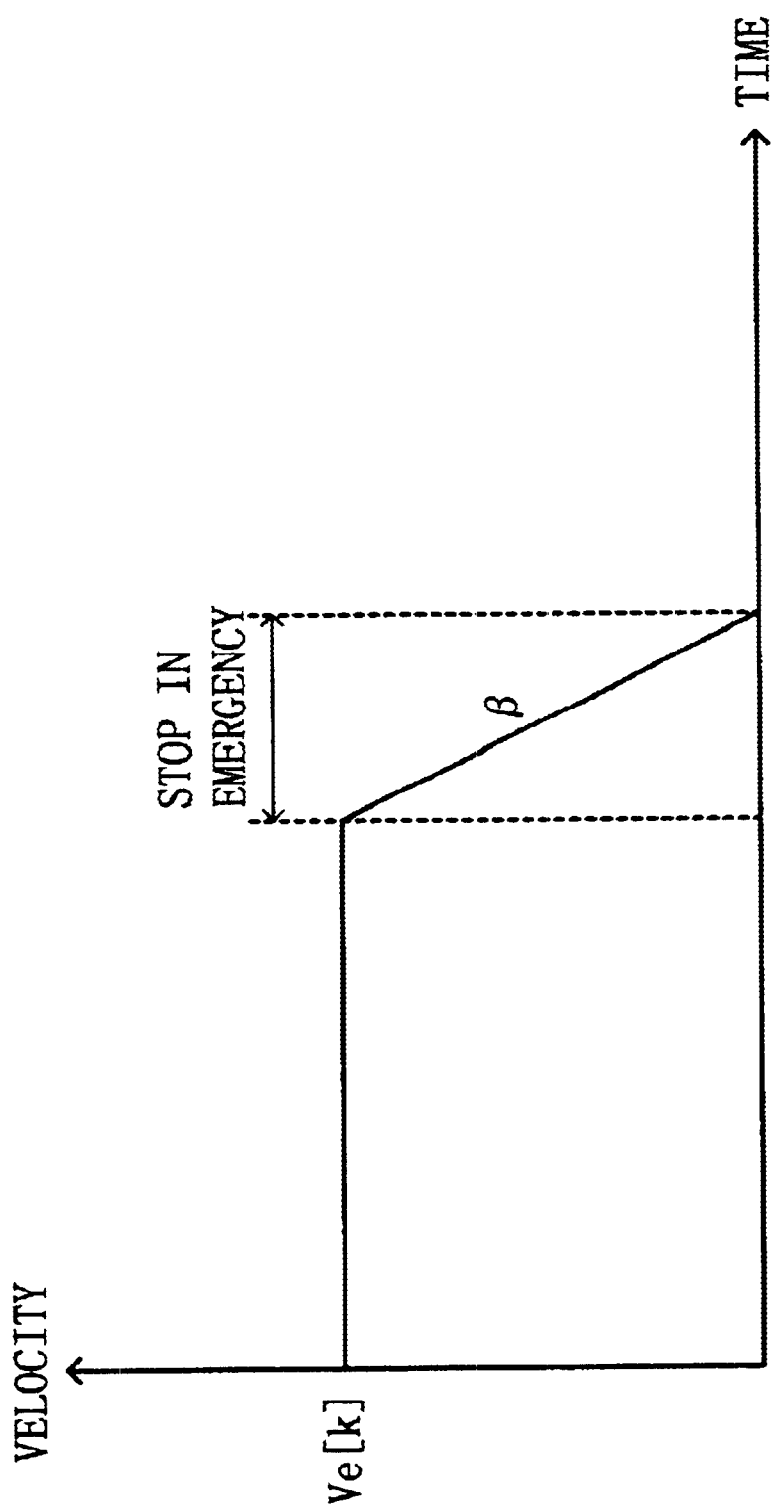
FIG. 11 is a diagram showing the modeled movement of the mover.

(c) In Case Where One Mover 10 Stops, While the Other Mover 10 is Approaching the One Mover 10 (FIG. 10C)

In the case where Conditions (15) and (16) are satisfied, the collision avoidance unit 6 determines that there is a great chance of collision between the two neighboring movers 10.

In the case where the right mover 10 stops in the position Xb, $$Xea[k]+Vea[k]^2/(2\beta)+d>Xb \qquad (15)$$

In the case where the left mover 10 stops in the position Xa, $$Xeb[k]-Veb[k]^2/(2\beta)-d<Xa \qquad (16)$$

Accordingly, in the case where a position, obtained by adding the butter length "d"to the position where the mover 10 stops in an emergency, exceeds the position where the other mover 10 stops in an emergency, the collision avoidance unit 6 determined that there is a great chance of collision between the two movers 10.

The collision avoidance unit 6 outputs an emergency signal to the mover controller 2 so as to stop the pair of neighboring movers 10 which ate determined to likely to collide with each other.

In this manner, even the different present address has not been acquired, the position and velocity in and with which the mover 10 travels can be found in detail. By modeling the movement of the movers 10, the estimated positions X[e] and the estimated velocities Ve[k] of the movers 10 can be derived using simple equations and conditions. Because the movement of the movers 10 is modeled, only few parameters are required. Thus, the determination of whether there is a great chance of collision between each pair of neighboring movers 10 can be made within a short period. As a result, the collision avoidance unit 6 can determine whether there is a great chance of collision with high accuracy, and can avoid the collision between each of the movers 10.

It is unlikely that each mover 10 of the library system will collide with another mover 10, right after the mover 10 begins to travel. Hence, in the above embodiment, the collision avoidance unit 6 has not determined whether there is a great chance that a mover 10 accelerating its travelling speed will collide With another mover 10, however, if necessary, the collision avoidance unit 6 may determine whether there is a great chance that the mover 10 accelerating its travelling speed will collide with another mover 10.

Figure 12:
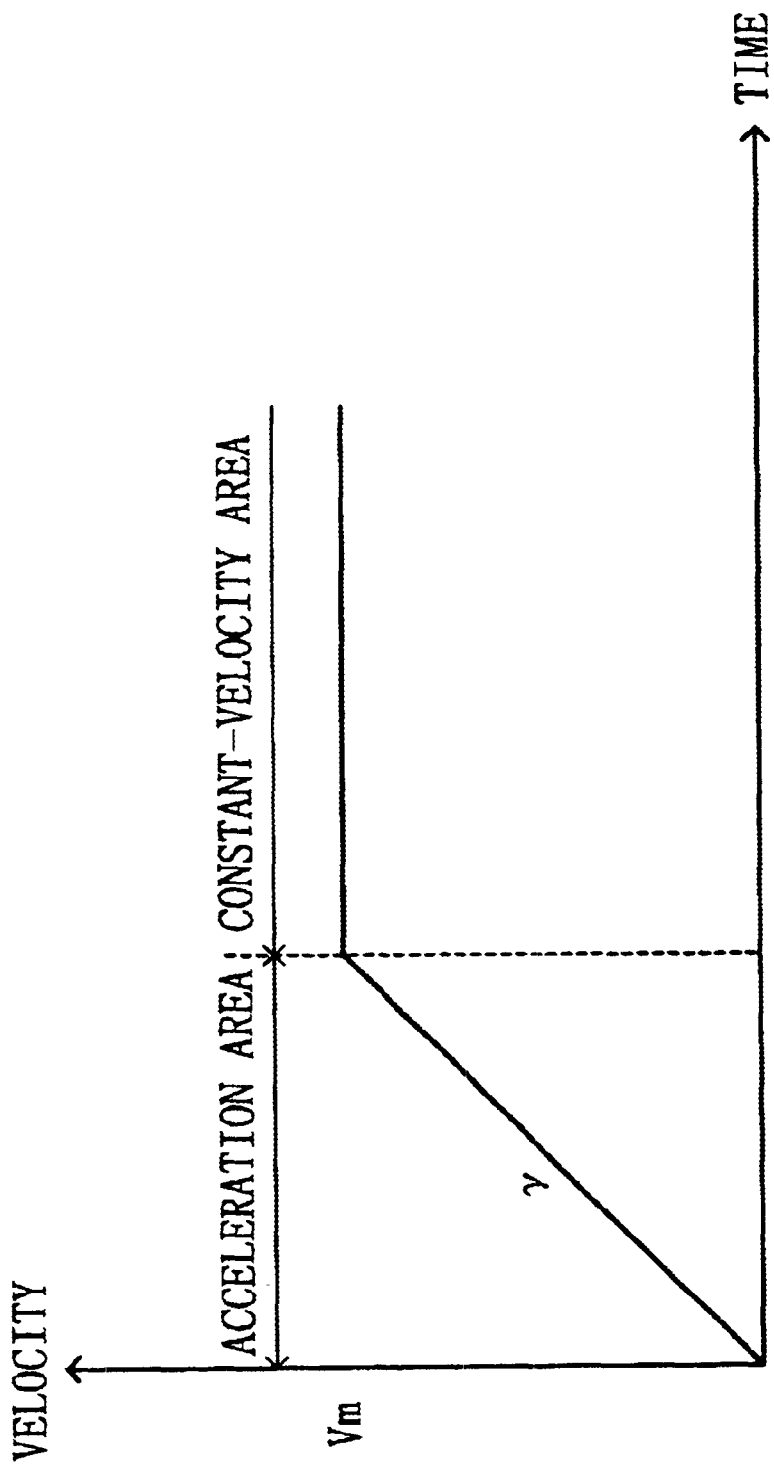
FIG. 12 is a diagram showing then modeled movement of the mover.

The movement of the accelerating mover 10 is modeled as shown in FIG. 12. Specifically, the mover 10 accelerates at an acceleration γ in an acceleration area. The acceleration γ is positive in the positive direction.

The collision avoidance unit 6 obtains the estimated position Xe[k] and the estimated velocity Ve[k] of the accelerating mover 10, based on the above-described movement model. In more particular, the collision avoidance unit 6 stores die position Xs where the mover 10 stops, and obtains the estimated position Xe[k] of the mover 10 using Equation (17) and the estimated velocity Ve[k] thereof using Equation (18). In this case the collision avoidance unit 6 uses Equations (17) and (18) in the range that the condition |Xe[k]−Xe[j]|<L can be satisfied. In other words, the address differs outside this range, so that the collision avoidance unit 6 can obtain the position and velocity of the mover 10 with high accuracy, using the coordinate transformation table 51.

$$Xe[k]=Xe[k-1]+(Ve[k-1]+\gamma\Delta T[k]/2)\Delta T[k] \quad (17)$$

$$Ve[k]=Ve[k-1]+\gamma\Delta T[k] \quad (18)$$

Note that Xe[k−1]=Xs, and Ve[k−1]=0, at the time the mover 10 begins to accelerates its traveling speed.

The collision avoidance unit 6 may determine whether there is a great chance of collision between the two neighboring movers 10, using the obtained estimated position Xe[k] and the estimated velocity Ve[k], likewise the above.

As long as each address plate 20 can show addresses, there is no need to form the plurality of protrusions on the surface of the address plate 20. For example, the address plate 20 may be a plate having a plurality of recesses on its surface. Otherwise, each of the address plates 20 may he in the form of a bar-code like plate or film, on which a clear contrast of bright and dark colors is patterned.

In FIG. 1, two movers 11 are shown by way of example. However, the number of the movers 10 is not limited to two, and the number of the movers 10 may be three or more movers 10.

The travelling track may not he a straight line, and may include a bent portion, for example. The travelling track may be branched into a plurality of tracks to have two dimensions. The branched tracks may overlap each other at predetermined intervals to have three dimensions.

The collision avoidance system may be employed for purposes other than the above purpose for avoiding the collision between movers 10 included in the library system. For example, the collision avoidance system may be employed for avoiding the collision between objects arranged in a parking lot.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and nm on an OS (Operating System) to execute the above-described processes, thereby achieving the system of the present invention. The above program and data may be stored in a disk device or the like in the server device on the Internet, and embedded in a carrier wave The program and data embedded in the carrier wave may be downloaded into the computer so as to realize the system of the present invention.

Various embodiments and changes may be made thereonto without departing from the broad spirit and scope of the invention. The above-described embodiment is intended to illustrate the present invention not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-337438 filed on Nov. 6, 2000, and including specification, claims, drawings and summary. The disclosure of the above Japanese Patent Application is incorporated herein by reference in its entirety.

What is claimed is:

1. A collision avoidance system which avoids a collision between a plurality of movers traveling on a path divided into sections of various lengths, said system comprising:

a position/velocity calculator which estimates a position and velocity for each of the plurality of movers based upon one of a first position and first velocity for each of the plurality of movers which passes a boundary between adjacent sections and a second position and second velocity for each of the plurality of movers which are traveling within any of said sections based upon a previous of said first position and first velocity for each of the plurality of movers which are traveling within any of said sections;

a collision-chance determiner which determines whether there is a chance that each two neighboring movers will collide with each other, using said estimates of position and velocity, and an emergency stopper which stops two neighboring movers when said collision-chance determiner determines that there is a chance of collision between the two neighboring movers.

2. The collision avoidance system according to claim 1, wherein said position/velocity calculator includes:

a boundary calculation unit which obtains the first position and first velocity of each of the plurality of movers in a case where each of the plurality of movers passes a boundary between the adjacent sections; and a section-calculation unit which obtains the second position and second velocity of each of the plurality of movers in any of the sections, based on a modeled movement, using the first position and first velocity obtained by said boundary calculation unit.

3. The collision avoidance system according to claim 2, wherein: each of the sections is identified based on its address, and wherein said collision avoidance system further comprises:

an address detector which detects first addresses of the sections in which the plurality of movers are traveling; and an address-difference determiner which determines whether the first addresses detected by said address detector are different respectively from second addresses detected by said address detector a predetermined period ago, determines, in a case where it is determined that the first address is different from the second address, that any of the plurality of movers traveling in the section with the first address has passed a boundary between adjacent sections, and determines, in a case where it is determined that the first address is not different from the second address, that any of the plurality of movers is traveling in the section with the first address, wherein said boundary calculation unit obtains the first position and first velocity of any of the movers traveling in the section with the first address, in the case where it is determined that the first address is different from the second address, and wherein said section-calculation unit obtains the second position and second velocity of any of the movers traveling in the section with the second address, in the case where it is determined that the first address is not different from the second address.

4. The collision avoidance system according to claim 3, wherein the movement is expressed in a form of a model, wherein the mover travels with a constant velocity and slows down at a constant acceleration.

5. The collision avoidance system according to claim 3, wherein the movement is expressed in a form of a model, wherein the mover accelerates at a constant acceleration, travels with a constant velocity and slows down at a constant acceleration.

6. The collision avoidance system according to claim 3, further comprising a memory unit which stores association information representing the address and boundary positions of each of the sections, in association each other, wherein said boundary calculation unit comprises:

a position calculation unit which obtains, as a position of the mover, one of the boundary positions of the section in which the mover is traveling and having the first address, and a velocity calculation unit which obtains a velocity of the mover traveling in the section having the first address, by dividing a length of one of the plurality of sections which has the second address by a time period since said address-difference determiner determines that the first address is different from the second address until a next time said address-difference determiner determines that the first address is different from the second address.

7. The collision avoidance system according to claim 6, wherein said position calculation unit obtains, as a position of the mover, one of the boundary positions that the mover has passed, of the boundary positions of the section in which the mover is traveling.

8. A position detector comprising:

a first calculation unit which obtains a position and calculates a velocity of a mover traveling on a path divided into sections of various lengths, in a case where the mover passes a boundary between adjacent sections; and a second calculation unit which calculates position of the mover traveling in any of the sections, using a previous position and velocity obtained by said first calculation unit.

9. The position detector according to claim 8, wherein said second calculation unit obtains the position of the mover traveling in any of the sections, based on a modeled movement, using the previous position and velocity obtained by said first calculation unit.

10. The position detector according to claim 9, wherein each of the sections is identified based on its address wherein said position detector further comprises:

an address detector which detects a first address of the section in which the mover is traveling, and an address-difference determiner which
determines whether the first address detected by said address detector is different from a second address detected by said address detector a predetermined period ago, determines, in a case where it is determined that the first address is different from the second address, that the mover traveling in the section with the first address has passed a boundary between adjacent sections, and determines, in a case where it is determined that the first address is not different from the second address, that the mover is traveling in a section with the first address;

wherein said first calculation unit obtains the position and velocity of the mover traveling in the section with the first address, in the case where it is determined that the first address is different from the second address; and wherein said second calculation unit obtains the position of the mover traveling in the section with the second address, in the case where it is determined that the first address is not different from the second address.

11. The position detector according to claim 10, wherein the movement is expressed in a form of a model, wherein the mover travels with a constant velocity and slows down at a constant acceleration.

12. The position detector according to claim 10, wherein the movement is expressed in a form of a model, wherein the mover accelerates at a constant acceleration, travels with a constant velocity and slows down at a constant acceleration.

13. The position detector according to claim 10, further comprising a memory unit which stores association information representing the address and boundary positions of each of the sections, in association each other wherein said first calculation unit comprises:

a position calculation unit which obtains, as a position of the mover, one of the boundary positions of the section in which the mover is traveling and having the first address, and a velocity calculation unit which obtains a velocity of the mover traveling in the section having the first address, by dividing a length of one of the plurality of sections which has the second address by a time period since said address-difference determiner determines that the first address is different from the second address until a next time said address-difference determiner determines that the first address is different from the second address.

14. The position detector according to claim 13, wherein said position calculation unit obtains, as a position of the mover, one of the boundary positions that the mover has passed, of the boundary positions of the section in which the mover is traveling.

15. A collision avoidance method of avoiding a collision between a plurality of movers traveling on a path divided into sections of various lengths, said method comprising:

estimating a position and velocity for each of said plurality of movers based upon one of a first position and first velocity for each the plurality of movers which passes a boundary between adjacent sections and a second position and second velocity for each of the plurality of movers which are traveling within any of said sections based upon a previous of said first position and first velocity for each of the plurality of movers which are traveling within any of said sections;

determining whether there is a chance that each two neighboring movers will collide with each other, using said estimates; and stopping two neighboring movers that there is a chance of collision between the two neighboring movers.

16. The collision avoidance method according to claim 15, wherein said estimating the position and velocity includes:

obtaining a previous first position and first velocity of each of the plurality of movers in a case where each of the plurality of movers passes the boundary between the adjacent sections; and obtaining the second position and second velocity of each of the plurality of movers in any of the sections, based on a modeled movement of a mover, using the previous first position and first velocity obtained in the case where each of the plurality of movers passes the boundary therebetween.

17. The collision avoidance method according to claim 16, wherein:

each of the sections is identified based on its address;

said collision avoidance method further comprises;

detecting first addresses of the sections in which the plurality of movers are traveling, and determining whether the detected first addresses are different respectively from second addresses detected a predetermined period ago, determining, in a case where it is determined that the first address is different from the second address, that any of the plurality of movers traveling in the section with the first address has passed a boundary between adjacent sections, and determining, in a case where it is determined that the first address is not different from the second address, that any of the plurality of movers is traveling in the section with the first address;

said obtaining the first position and first velocity of each of the plurality of movers includes obtaining the first position and first velocity of any of the movers traveling in the section with the first address, in the case where it is determined that the first address is different from the second address; and said obtaining the second position and second velocity of each of the plurality of movers based on the modeled movement includes obtaining the second position and second velocity of any of the movers traveling in the section with the second address, in the case where it is determined that the first address is not different from the second address.

18. The collision avoidance method according to claim 17, wherein the movement is expressed in a form of a model, wherein the mover travels with a constant velocity and slows down at a constant acceleration.

19. The collision avoidance method according to claim 17, wherein the movement is expressed in a form of a model, wherein the mover accelerates at a constant acceleration, travels with a constant velocity and slows down at a constant acceleration.

20. The collision avoidance method according to claim 17, wherein:

said collision avoidance method further comprises storing association information representing the address and boundary positions of each of the sections, in association each other; and said obtaining the first position and first velocity includes obtaining, as a position of the mover, one of the boundary positions of the section in which the mover is traveling and having the first address, and obtaining a velocity of the mover traveling in the section having the first address, by dividing a length of one of the plurality of section which has the second address by a time period since said it is determined that the first address is different from the second address until it is determined that the first address is different from the second address.

21. The collision avoidance method according to claim 20, wherein said obtaining, as the position of the mover, the one of the boundary positions of the section includes obtaining, as a position of the mover, one of the boundary positions that the mover has passed, of the boundary positions of the section in which the mover is traveling.

22. A position detecting method comprising:

obtaining a first position and calculating a first velocity of a mover traveling on a path divided into sections of various lengths, in a case where the mover passes a boundary between adjacent sections; and calculating a second position and second velocity of the mover includes obtaining a position of the mover traveling in any of the sections, using a previously obtained first position and first velocity.

23. The position detecting method according to claim 22, wherein said obtaining the second position and second velocity of the mover includes obtaining a position of the mover traveling in any of the sections, based on a modeled movement of the mover, using the previously obtained first position and first velocity.

24. The position detecting method according to claim 23, wherein:

each of the sections is identified based on its address;

said position detecting method further comprises:

detecting a first address of the sections in which the mover is traveling, and determining whether the detected first address is different from a second address detected a predetermined period ago, determining, in a case where it is determined that the first address is different from the second address, that the mover traveling in the section with the first address has passed a boundary between adjacent sections, and determining, in a case where it is determined that the first address is not different from the second address, that the mover is traveling in the section with the first address;

said obtaining the first position and first velocity of the mover includes obtaining the first position and first velocity of the mover traveling in the section with the first address, in the case where it is determined that the first address is different from the second address; and said obtaining the second position and second velocity of the mover includes obtaining the second position and second velocity of the mover traveling in the section with the second address, in the case where it is determined that the first address is not different from the second address.

25. The position detecting method according to claim 24, wherein the movement is expressed in a form of a model, wherein the mover travels with a constant velocity and slows down at a constant acceleration.

26. The position detecting method according to claim 24, wherein the movement is expressed in a form of a model, wherein the mover accelerates at a constant acceleration, travels with a constant velocity and slows down at a constant acceleration.

27. The position detecting method according to claim 24, wherein:

said position detecting method further comprises storing association information representing the address and boundary positions of each of the sections, in association each other; and said obtaining then first position and first velocity of the mover includes;

obtaining, as the first position of the mover, one of the boundary positions of the section in which the mover is traveling and having the first address, using the association information, and obtaining the first velocity of the mover traveling in the section having the first address, by dividing a length of one of the plurality of sections which has the second address by a time period since it is determined that the first address is different from the second address until it is determined that the first address is different from the second address.

28. The position detecting method according to claim 27, wherein said obtaining, as a position of the mover, the one of the boundary positions of the section includes obtaining, as a position of the mover, one of the boundary positions that the mover has passed, of the boundary positions of the section in which the mover is traveling.

29. A program for controlling a computer to function as a collision avoidance system which avoids a collision between a plurality of movers traveling on a path divided into sections of various lengths, said system comprising:

a position/velocity calculator which estimates a position and velocity of each of said plurality of movers based upon one of a first position and first velocity for each of the plurality of movers which passes a boundary between adjacent sections and a second position and second velocity for each of the plurality of movers which are traveling within any of said sections based upon a previous of said first position and first velocity for each of the plurality of movers which are traveling within any of said sections;

a collision-chance determiner which determines whether there is a chance that each two neighboring movers will collide with each other, using said estimates, and an emergency stopper which stops two neighboring movers that said collision-chance determiner determines that there is a chance of collision between the two neighboring movers.

30. A program for controlling a computer to function as a position detector comprising:

a first calculation unit which obtains a position and calculates a velocity of a mover traveling on a path divided into sections of various lengths, in a case where the mover passes a boundary between adjacent sections; and a second calculation unit which calculates a position of the mover traveling in any of the sections, using a previous position and velocity obtained by said first calculation unit.

* * * * *